(12) United States Patent
Shepherd et al.

(10) Patent No.: US 8,195,458 B2
(45) Date of Patent: Jun. 5, 2012

(54) OPEN CLASS NOUN CLASSIFICATION

(75) Inventors: Michael David Shepherd, Ontario, NY (US); Kirk J. Ocke, Ontario, NY (US); Barry Glynn Gombert, Rochester, NY (US); Dale Ellen Gaucas, Penfield, NY (US)

(73) Assignee: Xerox Corporation, Norwalk, CT (US)

(*) Notice: Subject to any disclaimer, the term of this patent is extended or adjusted under 35 U.S.C. 154(b) by 87 days.

(21) Appl. No.: 12/858,168

(22) Filed: Aug. 17, 2010

(65) Prior Publication Data

US 2012/0047128 A1    Feb. 23, 2012

(51) Int. Cl.
G10L 15/06    (2006.01)

(52) U.S. Cl. ............ 704/240; 704/1; 704/231; 707/706; 707/736; 707/758; 715/254

(58) Field of Classification Search ............... None
See application file for complete search history.

(56) References Cited

U.S. PATENT DOCUMENTS

| | | | | |
|---|---|---|---|---|
| 5,930,788 A * | 7/1999 | Wical | ............ | 1/1 |
| 5,963,940 A * | 10/1999 | Liddy et al. | ............ | 1/1 |
| 7,062,498 B2 * | 6/2006 | Al-Kofahi et al. | ............ | 1/1 |
| 7,096,179 B2 * | 8/2006 | Zhu et al. | ............ | 704/1 |
| 7,289,982 B2 * | 10/2007 | Saito et al. | ............ | 1/1 |
| 7,778,817 B1 * | 8/2010 | Liu et al. | ............ | 704/9 |
| 8,005,862 B2 * | 8/2011 | Zwol et al. | ............ | 707/791 |
| 2002/0022956 A1 * | 2/2002 | Ukrainczyk et al. | ............ | 704/9 |
| 2003/0004776 A1 * | 1/2003 | Perrella et al. | ............ | 705/9 |
| 2004/0049498 A1 * | 3/2004 | Dehlinger et al. | ............ | 707/3 |
| 2004/0267737 A1 * | 12/2004 | Takazawa et al. | ............ | 707/3 |

OTHER PUBLICATIONS

Girju et al, "On the semantics of noun compounds", Computer Speech and Language, 2005.*
Li et al, "Classifying What-type Questions by Head Noun Tagging", Proceedings of the 22$^{nd}$ International Conference on Computational Linguistics, Aug. 2008.*
Patel et al, "Automatic Classification of Previously Unseen Proper Noun Phrases into Semantic Categories Using an N-Gram Letter Model", Stanford University, 2001.*
Plaster et al, "Noun Classes Grow on Trees: Noun Classification in the North-East Caucasus", Harvard University, 2009.*
Rosario et al, "Classifying the Semantic Relations in Noun Compounds via a Domain-Specific Lexical Hierarchy", Berkeley university, 2001.*
Tratz et al, "A Taxonomy, Dataset, and Classifier for Automatic Noun Compound Interpretation", Proceedings of the 48$^{th}$ Annual Meeting of the Association for Computational Linguistics, 2010.*

* cited by examiner

*Primary Examiner* — Hung Le
(74) *Attorney, Agent, or Firm* — Pepper Hamilton LLP

(57) ABSTRACT

A method of semantically classifying a data set of open class nouns and a system for executing the method. The method includes loading, by a processing device, a data set comprising one or more open class nouns from a computer readable medium operably connected to the processing device; extracting, by the processing device, the one or more open class nouns from the data set; for each open class noun, querying, by the processing device, one or more application programming interfaces (APIs) to produce one or more results; deriving, by the processing device, a confidence score for the data set based upon the one or more results; and determining, by the processing device, a classification for the data set based upon the derived confidence score.

14 Claims, 4 Drawing Sheets

OPEN CLASS NOUN CLASSIFICATION

RELATED APPLICATIONS

This application is related to U.S. patent application Ser. No. 12/857,997, filed Aug. 17, 2010, the contents of which are hereby incorporated by reference.

BACKGROUND

The present disclosure relates to methods and systems for semantically classifying open class nouns. In some embodiments, the present disclosure relates to methods and systems for semantically classifying a data set including a large number of open class nouns.

Many websites and interactive software programs include or create various data sets including one or more pieces of data. Typically, semantically classifying the data included in these data sets requires comparing each piece of data in the set to an electronic knowledge-base (EKB) to determine the classification for the individual datum. Various classifications may include first names, last names, peoples' whole names, street names, business names, product names, song titles, book titles, etc. However, occasionally a data set will include various pieces of data that overlap two or more classifications, thereby making a single comparison to one or more EKBs unreliable to classify a data set.

In typical digital marketplaces, a user can use a keyword or semantically-based search to identify individual content such as text phrases and custom graphics and images. However, content and other digital media previously organized into data sets, such as a data set including pieces of data that overlap two or more classifications, is difficult to search as the search results may include a large number of returned pieces of data, many of which may be unrelated to the user's search. This can result in lost revenue for the digital marketplace because the user may be unable to sort through the results to find what they are looking for, and thus, the user may not purchase the content.

Additionally, variable-data marketing campaigns rely on one or more data sources to produce dynamic documents consisting of variable content. The dynamic documents are targeted toward particular recipients (e.g., customers, prospects, event invitees, etc.). The cleanliness of the data source content is crucial toward the success of a variable-data marketing campaign. Therefore, accurate semantic identification of data source content is highly valued.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In one general respect, the embodiments disclose a method of semantically classifying a data set of open class nouns. The method includes loading, by a processing device, a data set comprising one or more open class nouns from a computer readable medium operably connected to the processing device; extracting, by the processing device, the one or more open class nouns from the data set; for each open class noun, querying, by the processing device, one or more application programming interfaces (APIs) to produce one or more results; deriving, by the processing device, a confidence score for the data set based upon the one or more results; and determining, by the processing device, a classification for the data set based upon the derived confidence score.

In another general respect, the embodiments disclose a system for semantically classifying a data set of open class nouns. The system includes a processing device and a computer readable medium in communication with the processing device. The computer readable medium includes one or more programming instructions that, when executed, cause the processing device to load a data set comprising one or more open class nouns from the computer readable medium, extract the one or more open class nouns from the data set, for each open class noun, query one or more application programming interfaces (APIs) to produce one or more results, derive a confidence score for the data set based upon the one or more results, and determine a classification for the data set based upon the derived confidence score.

In another general respect, the embodiments disclose a method of semantically classifying a data set of open class nouns. The method includes loading, by a processing device, a data set comprising one or more open class nouns from a computer readable medium operably connected to the processing device; processing, by the processing device, the data set to determine one or more application programming interfaces (APIs) to query; extracting, by the processing device, the one or more open class nouns from the data set; for each open class noun, querying, by the processing device, the determined one or more APIs to produce one or more results; deriving, by the processing device, a confidence score for the data set based upon the one or more results; and determining, by the processing device, a classification for the data set based upon the derived confidence score.

DETAILED DESCRIPTION

Figure 1:
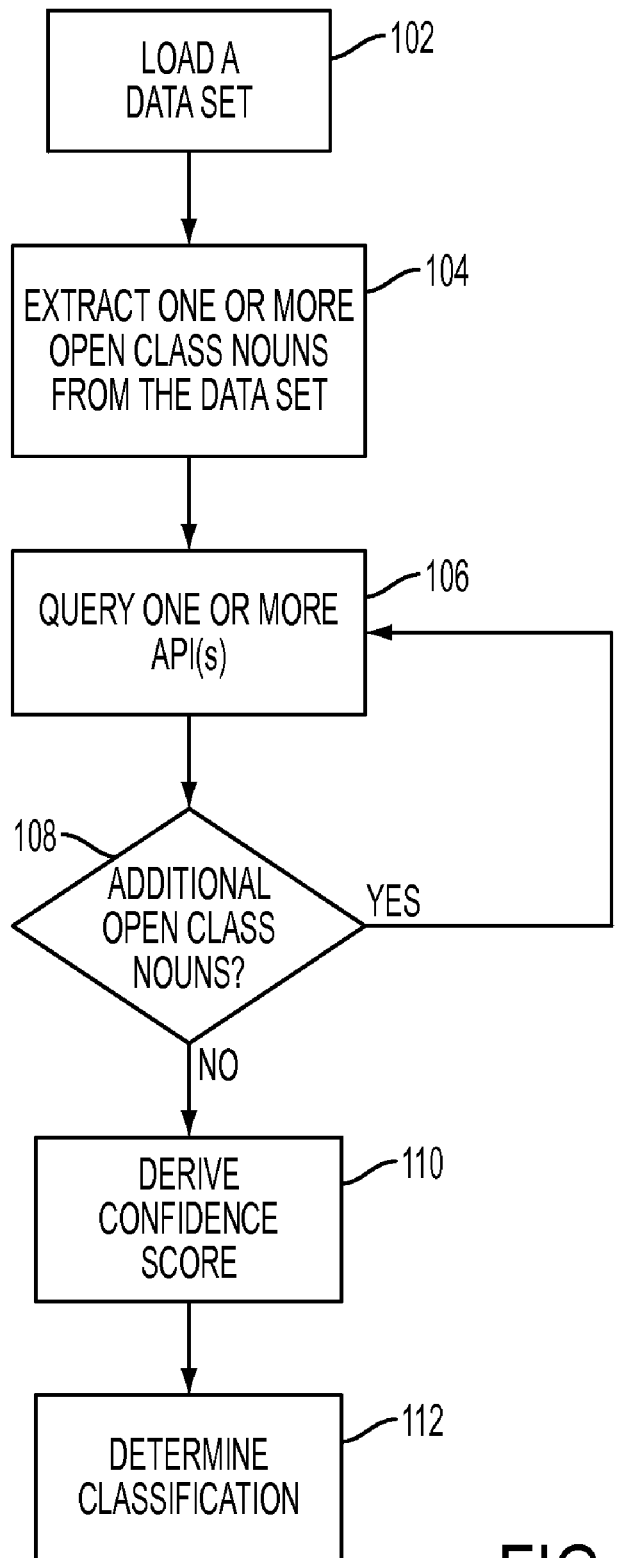
FIG. 1 illustrates a flow diagram of an exemplary process for semantically classifying a data set including various open class nouns according to an embodiment.

For purposes of the discussion below, a "campaign" refers to set of related media documents having variable data content and intended for one or more recipients.

"Semantically classifying" refers to a process of assigning a received datum to at least one of a plurality of predetermined semantic classes based upon one or more heuristics or characteristics of the datum.

An "electronic knowledge-base" (EKB) refers to one or more electronic data structures for storing various fact-based pieces of data. Generally, EKBs are sorted and searchable for determining various classifications types for a data set.

An "open class noun" refers to a freeform piece of data (typically a proper noun) that is not generally stored in an EKB or may overlap several EKBs.

An "application programming interface" (API) refers to a software interface designed to interact with additional software such as data repositories, libraries, operating systems, or other additional software to access various services.

The present disclosure provides a system and method for semantically classifying open class nouns, organized in various data sets, such that reliable classifications are determined for the open class nouns. Semantic classification of a data set of open class nouns is not efficient or reliable using current semantic searching approaches. For example, a user cannot query an EKB to easily discern a list of peoples' first names.

The system and method discussed herein provides a collection of one or more network based application programming interfaces (APIs) gathered together into a single portal or interface accessible to a user. The portal provides querying capabilities that may determine the existence and classification of open class nouns stored in a data set. Each API may provide one or more query methods for access to a repository of open class nouns. For example, a telephone directory such as www.whitepages.com may have an associated web-based API call associated with the website. The web-based API call may be used by the portal to look up one or more persons' names. By querying a sample set of data against each available data repository, a probabilistic confidence score (referred to herein as "confidence score") may be determined for each data set. The confidence score may be determined or derived based upon a number of hits or positive matches a data set has when compared to a specific data repository. Based upon the confidence score, a classification may be determined for the data set of open class nouns.

Examples of web-based APIs offering data repositories for querying may include, but are not limited to, the following:
- Book Titles: LibraryThing® API, Amazon's Product Advertizing® API, Google® Book Search API, and BookMooch® API
- Album or Song Titles: Rhapsody® API, Internet Video Archive® API, LazyTune® API
- Movie Titles: Internet Video Archive® API, FilmCrave® API, TRYNT® Movie IMDB Web Service API
- Business Names: Yelp® API, Yellow Pages® API
- Street Names: White Pages® API, Google® Maps API, Yahoo® Maps API Each API may have its own programmatic interface to query its respective repositories. Numerous programming mechanisms currently exist to interface with various web-based APIs. For example, a representational state transfer (REST) interface may be used over a hypertext transfer protocol (HTTP) connection, supporting various data formats such as extensible markup language (XML), JavaScript object notation (JSON), and hypertext preprocessing (PHP). More details regarding the system and method taught herein are discussed in the following discussions related to FIGS. 1-4.

FIG. 1 illustrates a flow diagram of an exemplary process for semantically classifying a data set of open class nouns. A data set is loaded 102 from either a local or remote computer readable medium. The data set may include a database, a spreadsheet, a linked list, or any similar data structure. One or more open class nouns may be extracted 104 from the data set. Extracting 104 the one or more open class nouns may include extracting individual pieces of data, identifying and/or extracting a list of sources for each open class noun, and extracting meta-data related to any sources for the open class nouns.

For each open class noun extracted 104 from the data set, one or more APIs may be queried 106. A standard list of APIs may be queried 106 for every data set, or a specific list of APIs may be determined for each data set. For example, a data set may be preprocessed to determine a "best guess" set of APIs to query 106. To determine the best guess, various rules may be employed. One rule may be to analyze the data set of open class nouns for average word length, phrase length, common words used, capitalization used, etc. Based upon this analysis, a set of APIs may be determined to query 106. For example, if the words "drive, street, road" are commonly used, an API related to addresses may be queried 106. Similarly, an EKB may be used to discover the classification of various entries in the data set. Based upon the classifications determined based upon the EKB, similar APIs may be determined for querying 106. For example, if searching and EKB results in the classifications "first name," "last name," and "city name" being associated with open class nouns in the data set, then APIs corresponding to persons' names and city names may be queried 106.

The one or more APIs may be queried 106 for each open class noun in the data set. If it is determined 108 that there are additional open class nouns, the APIs are queried 106 until each open class noun in the data set has been queried for each API. Based upon the results of the querying 106, a confidence score may be derived 110. The confidence score may indicate the results of the querying of each open class noun in the data set. To derive 110 the confidence score, the results of the individual queries 106 may be tallied into a single confidence score. For example, as a new classification type (e.g., first name, last name) is determined during the querying, a value is assigned to that classification type. Initially, the value may be 1/N, where N is the total number to open class nouns in the data set. For each open class noun classified in that classification type, the value is incremented (e.g., 2/N . . . 3/N . . . 4/N). Once each open class noun has been queried 106, the confidence score may be derived 110 by converting each classification type value into a decimal number.

For example, if a data set has 100 open class nouns, each classification type value will be X/100, where X is the total number of open class nouns in the set determined to be of that classification type. Thus, the results of the querying may be 95/100 are first names, 8/100 are last names, and 4/100 are city names. In this example, if 95/100 of the open class nouns in the data set were classified as "first names," 8/100 were classified as "last names," and 4/100 were classified as "city names," the confidence score may be derived 110 as 0.95/0.08/0.04 [first names, last names, city names], with the highest likelihood the data set contains first names. Thus, the confidence score may be a product of the likelihood that each open class noun in the data set belongs to a specific classification. To continue the above example, based upon the confidence score of 0.95/0.08/0.04 [first names, last names, city names], there may be a 95% likelihood that the data set is first names, an 8% likelihood that the data set is last names, and a 4% likelihood that the data set is city names.

Figure 2:
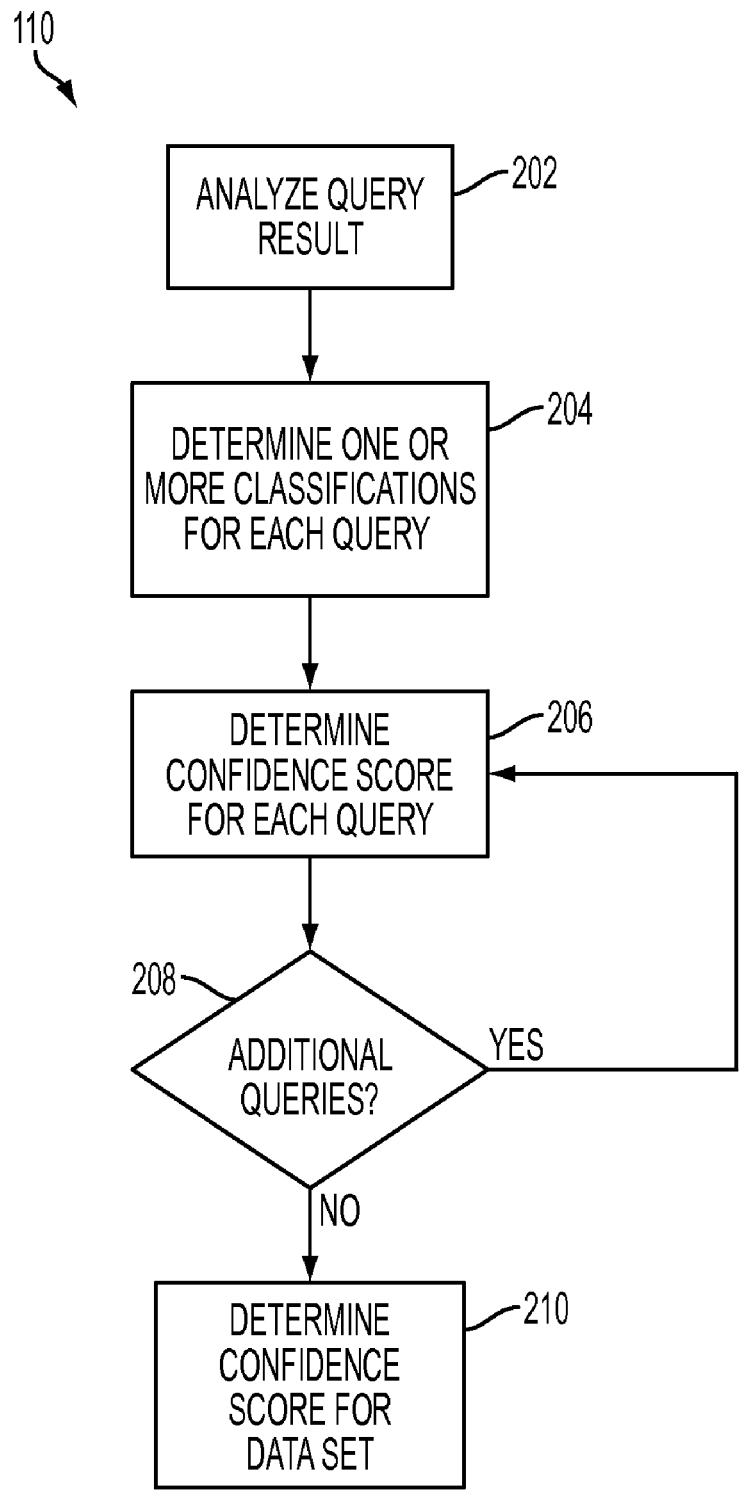
FIG. 2 illustrates a flow diagram of an exemplary process for determining a confidence score for a data set including various open class nouns according to an embodiment.

It should be noted that a single open class noun may have multiple classifications. For example, "Scott" may be classified as a first name, last name and city name. Thus, the total confidence score for a data set may not necessarily add up to 100%, but instead may be less than, equal to or greater than 100%. FIG. 2 illustrates additional details related to the derivation and interpretation of the confidence score.

Based upon the derived confidence score, a semantic classification may be determined 112 for the data set. To determine 112 the classification, the derived 110 confidence score may be analyzed and broken into individual classification types and associated likelihood values. The classification type with the highest likelihood value may be determined 112 to be the correct classification for the data set. To continue the above example, based upon the confidence score of 0.95/0.08/0.04 [first names, last names, city names], the associated data set may be semantically classified "First Names" as first names has the highest individual portion or percentage value on the confidence score.

It should be noted that additional techniques may be used to determine 112 the classification for the data set. For example, the confidence score may be modified or adjusted to assign individual confidence values to each possible classification based upon the derived 110 confidence score. These confidence values may then be compared to a confidence value threshold. For example, a single classification may have a confidence value of 0.90 or higher to be determined 112 as a potential classification for the data set. To continue the above example, first names has an individual confidence value of 0.95, and thus may be determined 112 as the classification for the data set. Additional techniques for determining 112 based upon known classification techniques or heuristics may also be used.

FIG. 2 illustrates an expanded view of an exemplary process used to derive 110 the confidence score as discussed above. Deriving 110 the confidence score may include analyzing 202 each query result. As discussed above, each open class noun queried 106 may determine 204 one or more classifications for each query result. Based upon the determined 204 one or more classifications, a partial confidence score may be determined 206 for each query. The partial confidence score may be determined 206 and updated for each query performed on the data set until there is a determination 208 that there are no additional open class nouns to query in the data set. Based upon the collective results of the queries, a confidence score for the data set may be determined 210.

One exemplary implementation of the above discussed process may be classifying a data set of 400 phrases, each having a length of 2-5 words. A sample portion of the data set may include {"Miles From Nowhere", "Catcher in the Rye", "The Vagrants", "Fahrenheit 451", "The Lost City", "Lord of the Flies", "All You Need is Love", . . . }. A rule set may preprocess the data set to perform the best guess analysis based upon various attributes of the data set entries such as phrase length. Based upon the preprocessing, it may be determined the data set is likely a list of titles.

Optionally, a query may be made against an EKB such a DBpedia to determine that some of the data set entries are book titles, song titles and movie titles. For example, a DBpedia query for "Catcher in the Rye" returns a classification of book title. However, a DBquery for "The Lost City" returns both book title and movie title, requiring further disambiguation. Similarly, a DBpedia query for "All You Need is Love" returns the classification song title.

Based upon the best guess preprocessing, a query may be limited to APIs that provide one or more of book titles, movie titles and song titles. A result count of positive hits is returned and monitored for each API query and stored as a partial confidence score. Once each query is performed, the confidence score for the complete data set is derived. Based upon the queries, it is determined that 98% of the open class nouns in the data set are book titles, 40% are movie titles, and 3% are song titles. Therefore, a semantic classification of book title may be determined with a high confidence level for this data set. Optionally, the confidence score of 0.98/0.40/0.03 [book titles, movie titles, song titles] may be retained for the data set for later review and/or further analysis.

Figure 3:
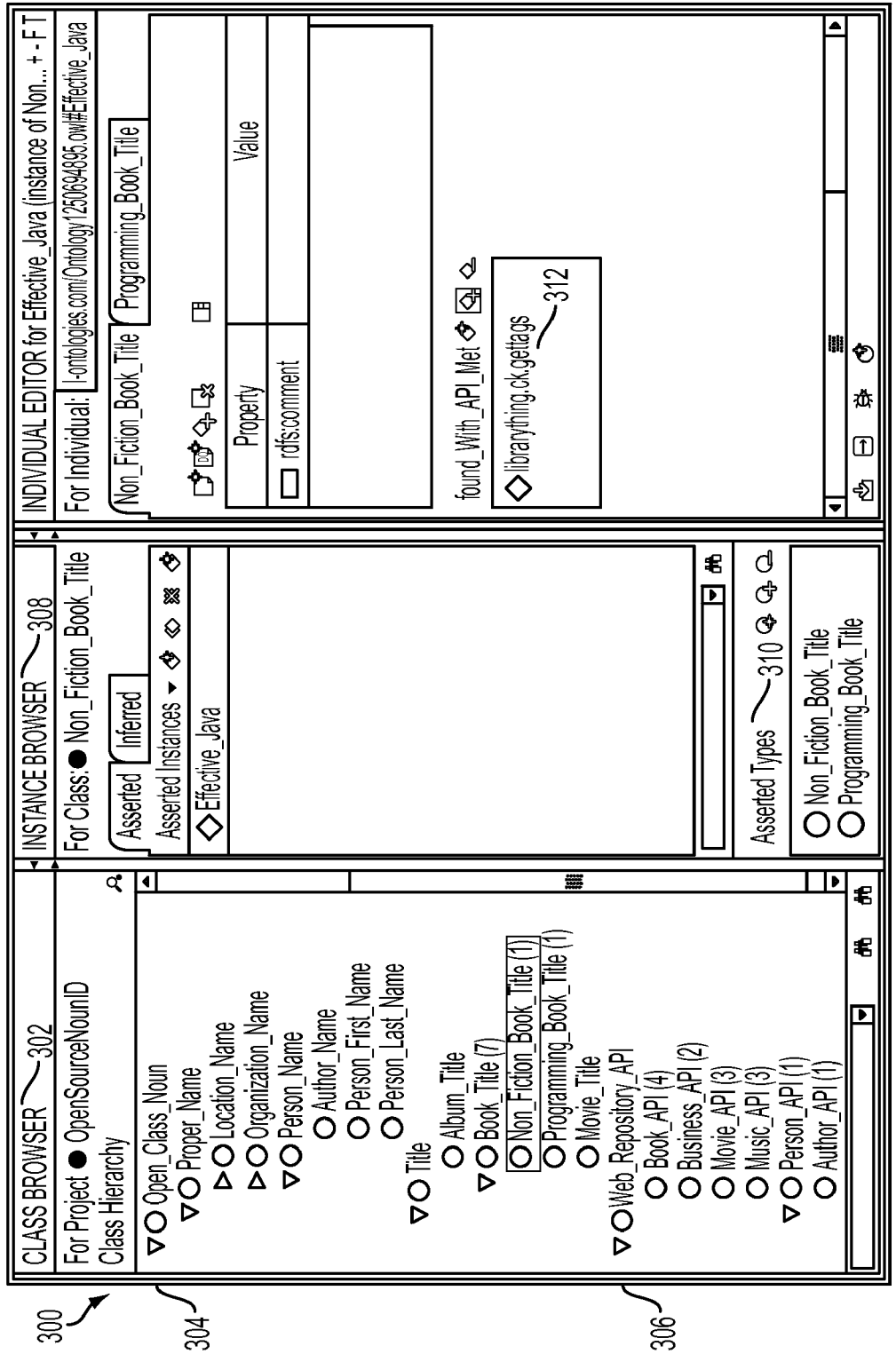
FIG. 3 illustrates an exemplary interface showing a query result for an open class noun according to an embodiment.

FIG. 3 illustrates a screenshot of an exemplary user interface 300 showing the semantic results of a sample query for the open class noun "Effective Java." The user interface 300 may include a semantic class browser 302. The semantic class browser 302 may include a hierarchy 304 of various classifications for open class nouns. In this example, the hierarchy 304 includes Proper_Name and Title. Each classification of the hierarchy may include additional sub-classifications. For example, Proper_Name includes Location_Name, Organization_Name and Person_Name. Similarly, Personal_Name may include additional sub-classifications Author_Name, Person_Last_Name and Person_First_Name. The semantic class browser 302 may also list a hierarchy of various APIs searched or available to search. In this example, various web-based APIs are listed in Web_Repository_API hierarchy 306. It should be noted the information shown in semantic class browser 302 is shown by way of example only. Additional classifications and APIs may be included in their respective hierarchies depending on the intended use and functionality of the user interface 300.

The user interface 300 may also include an instance browser 308 showing information specific to the queried open class noun. In this example, Effective_Java has returned the class Book_Title. Additionally, a list 310 of asserted types may be included. The asserted types list 310 provides additional information related to the query that may be used to infer additional information about the queried open class noun. Such assertions may be gathered via the same or a related API that provides querying for any tags or sub-classifications associated with the open class noun. In this example, based upon the query and returned results, one may infer that "Effective Java" is a non-fiction computer programming book.

The user interface 300 may include additional features such as an editor for modifying the query, various tabs for viewing additional information, a listing 312 of the APIs queried, and any additional information relevant to the query and results.

An exemplary implementation of the open class noun classification system as described above may be integrated with existing semantic classification system, functioning as a heuristic for semantically classifying a data set of open class nouns. For example, in a digital content marketplace such as the XMPie marketplace, a large amount of data contained in variable data campaigns may be stored as relatively unsorted data. The variable data campaigns may be previously developed by users, website content developers, graphical artists, and/or others who have created one or more electronic documents incorporating variable data. A new user to the marketplace may wish to purchase and distribute a variable data campaign. An existing campaign may satisfy any requirements the new user may have. However, because the variable data within the campaign is unsorted, the new user may not be able to identify the variable data campaign. Thus, the user may need to create an entirely new variable data campaign. This may cost the new user both time and money that would be ultimately saved if the previously created variable data campaigns were sorted and classified.

Various new or existing classification systems may be used to semantically classify some types of variable data in variable data campaigns using heuristics, but any data sets containing open class nouns may be improperly or ambiguously classified. However, the processes described and taught herein may be applied to the variable data campaign classification system such that any data sets of open class nouns may also be quickly and efficiently classified and organized for searching.

Figure 4:
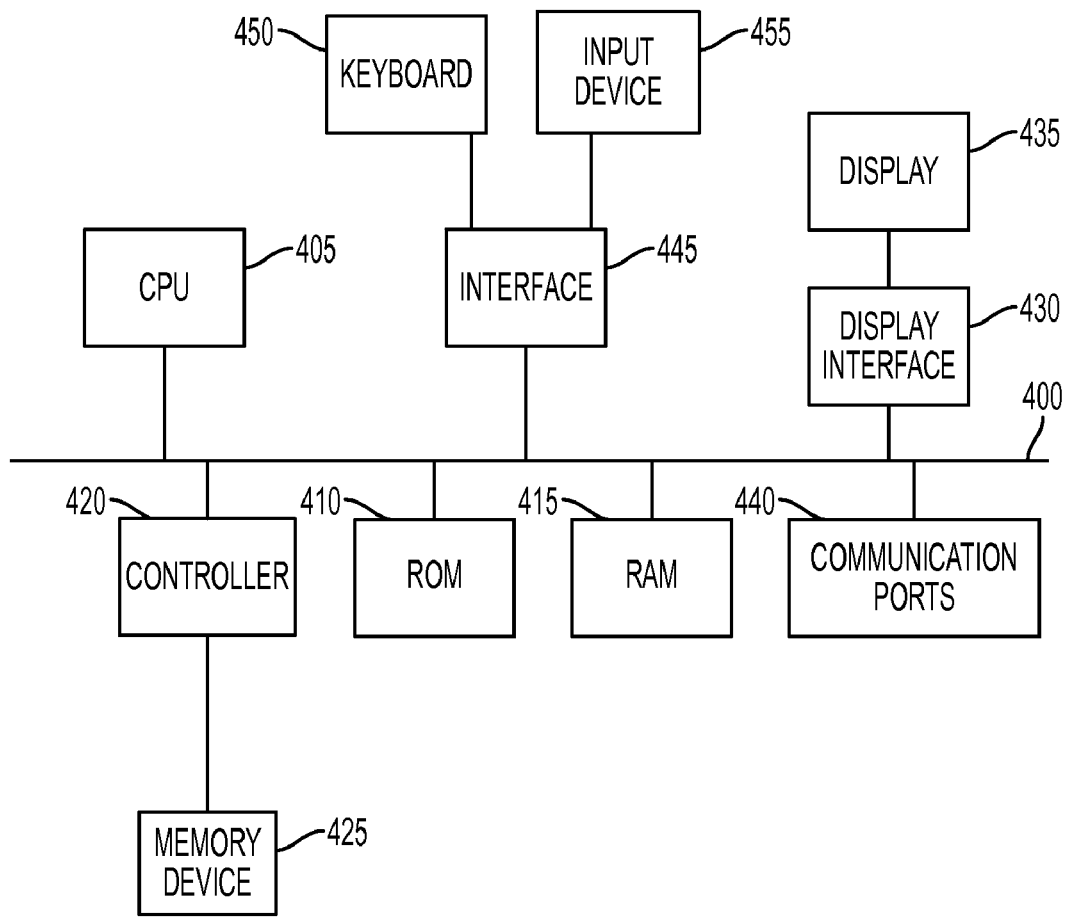
FIG. 4 illustrates various embodiments of a computing device for implementing various methods and processes described herein.

The variable data campaign classification system, user feedback interface, and various software modules described above may be presented on a display based on software modules including computer-readable instructions that are stored on a computer readable medium such as a hard drive, disk, memory card, USB drive, or other recording medium. FIG. 4 depicts a block diagram of exemplary internal hardware that may be used to contain or implement program instructions such as the process steps discussed above in reference to FIGS. 1 and 2 as well as a suitable processing and display devices to display the interface discussed above in reference to FIG. 3. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an exemplary processing device, computing device or processor as such terms are used within this disclosure. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any feedback information, common files for storing groups of feedback information, or one or more databases for storing the feedback information.

Program instructions, software or interactive modules for providing the interface and performing any querying or analysis associated with one or more data sets may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of semantically classifying a data set of open class nouns comprising:

loading, by a processing device, a data set comprising one or more open class nouns from a computer readable medium operably connected to the processing device;

extracting, by the processing device, the one or more open class nouns from the data set;

for each open class noun, querying, by the processing device, one or more application programming interfaces (APIs) to produce one or more results;

deriving, by the processing device, a confidence score for the data set based upon the one or more results, wherein the one or more results define one or more classifications for each open class noun in the data set; and wherein the deriving the confidence score comprises: analyzing the one or more classifications for each open class noun in the data set based upon the one or more results; and determining the confidence score based upon a combination of the one or more classifications for each open class noun;

determining, by the processing device, a classification for the data set based upon the derived confidence score.

2. The method of claim 1, further comprising displaying, on a display device operably connected to the processing device, the one or more results.

3. The method of claim 1, further comprising pre-processing the data set to determine one or more APIs to query.

4. The method of claim 3, wherein the pre-processing comprises determining the one or more APIs to query based upon at least one characteristic of the one or more open class nouns.

5. The method of claim 4, wherein the determining the one or more APIs to query comprises querying an electronic knowledge-base.

6. The method of claim 1, wherein the data set includes at least one of a database, a spreadsheet, and a linked list.

7. A system for semantically classifying a data set of open class nouns comprising:

a processing device; and a computer readable medium in communication with the processing device, wherein the computer readable medium comprises one or more programming instructions that, when executed, cause the processing device to:

load a data set comprising one or more open class nouns from the computer readable medium, extract the one or more open class nouns from the data set, for each open class noun, query one or more application programming interfaces (APIs) to produce one or more results, wherein the one or more results define one or more classifications for each open class noun in the data set; and wherein the deriving the confidence score comprises: analyzing the one or more classifications for each open class noun in the data set based upon the one or more results; and determining the confidence score based upon a combination of the one or more classifications for each open class noun, derive a confidence score for the data set based upon the one or more results, and determine a classification for the data set based upon the derived confidence score.

8. The system of claim 7, further comprising:

a display device operably connected to the processing device, wherein the computer readable medium further comprises one or more instructions that, when executed, cause the processing device to cause the one or more results to be displayed on the display device.

9. The system of claim 7, wherein the computer readable medium further comprises one or more instructions that, when executed, cause the processing device to pre-process the data set to determine one or more APIs to query.

10. The system of claim 9, wherein the one or more instructions for pre-processing comprise one or more instructions that, when executed, cause the processing device to determine the one or more APIs to query based upon at least one characteristic of the one or more open class nouns.

11. The system of claim 10, wherein the one or more instructions for determining the one or more APIs to query further comprise one or more instructions that, when executed, cause the processing device to query an electronic knowledge-base.

12. The system of claim 7, wherein the data set includes at least one of a database, a spreadsheet, and a linked list.

13. A method of semantically classifying a data set of open class nouns comprising:

loading, by a processing device, a data set comprising one or more open class nouns from a computer readable medium operably connected to the processing device;

processing, by the processing device, the data set to determine one or more application programming interfaces (APIs) to query;

extracting, by the processing device, the one or more open class nouns from the data set;

for each open class noun, querying, by the processing device, the determined one or more APIs to produce one or more results, wherein the one or more results define one or more classifications for each open class noun in the data set; and wherein the deriving the confidence score comprises: analyzing the one or more classifications for each open class noun in the data set based upon the one or more results; and determining the confidence score based upon a combination of the one or more classifications for each open class noun;

deriving, by the processing device, a confidence score for the data set based upon the one or more results; and determining, by the processing device, a classification for the data set based upon the derived confidence score.

14. The method of claim 13, further comprising displaying, on a display device operably connected to the processing device, the one or more results.

* * * * *